United States Patent
Gu

(10) Patent No.: US 7,125,627 B2
(45) Date of Patent: Oct. 24, 2006

(54) SECONDARY BATTERY HAVING A CONTAINER WITH A SAFETY UNIT

(75) Inventor: Chang-II Gu, Kimhae (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/347,304

(22) Filed: Jan. 21, 2003

(65) Prior Publication Data

US 2003/0148173 A1     Aug. 7, 2003

(30) Foreign Application Priority Data

Feb. 5, 2002     (KR) .................................. 2002-6499

(51) Int. Cl.
  *H01M 10/50* (2006.01)
  *H01M 2/00* (2006.01)
(52) U.S. Cl. ........................ 429/62; 429/162; 429/185; 429/181
(58) Field of Classification Search ................ 429/127, 429/163, 175, 176, 185, 186, 180, 162, 7, 429/57, 131, 62, 144
See application file for complete search history.

(56) References Cited

U.S. PATENT DOCUMENTS

| 5,422,200 A | * | 6/1995 | Hope et al. .................. 429/157 |
| 2001/0046623 A1 | * | 11/2001 | Akahira ........................ 429/94 |
| 2002/0071985 A1 | * | 6/2002 | Ooyama ....................... 429/94 |

FOREIGN PATENT DOCUMENTS

| JP | 2001-93489 | | 4/2001 |
| JP | 2001-093489 | * | 4/2001 |

* cited by examiner

*Primary Examiner*—Raymond Alejandro
(74) *Attorney, Agent, or Firm*—H.C. Park & Associates, PLC

(57) ABSTRACT

A secondary battery includes an electrode assembly; a laminated container laminated with flexible films, which encloses the electrode assembly while the electrode tabs are drawn out of the laminated container and is sealed by fusing resulting structure within a sealed portion; and a safety unit in the sealed portion, capable of being melted by excess heat generated from the secondary battery.

11 Claims, 3 Drawing Sheets

SECONDARY BATTERY HAVING A CONTAINER WITH A SAFETY UNIT

BACKGROUND OF THE INVENTION

1. Field of the Invention

The present invention relates to a secondary battery, and more particularly, to a lithium-ion secondary battery.

2. Description of the Related Art

Lithium secondary batteries have high energy densities per unit weight and operating voltages, which are typically three times higher than other secondary batteries, such as nickel-cadmium (Ni—Cd) batteries and nickel-metal hydride (Ni—MH) batteries. For these reasons, research and development thereof have constantly increased.

Lithium secondary batteries can be classified into liquid electrolyte batteries and solid polymeric electrolyte batteries according to the electrolyte used. In general, batteries using a liquid electrolyte are called as lithium-ion batteries, and batteries using a polymeric electrolyte are called as lithium polymer batteries.

Lithium secondary batteries can be manufactured in various shapes. Cylindrical and rectangular shapes are frequently used for lithium-ion batteries. Since lithium polymer batteries are rather safe, light, and can be molded in various shapes, they can be more advantageously used for slim, lightweight portable electronic devices, compared to other secondary batteries.

However, when a lithium secondary battery is overcharged or short-circuited between the anode and cathode plates while assembling electrodes, an electrolyte containing lithium salts in an organic solvent decomposes at the cathode plate and the lithium metal is separated at the anode plate. This degrades battery properties and causes internal short circuits in a battery. Furthermore, heats and gases generated when the lithium secondary battery is overcharged increase the internal pressure of the battery, risking explosions or fire.

To eliminate these problems of overcharging and short circuits in the lithium secondary battery, a general canned lithium-ion battery has an internal safety device, such as a shut-down separator, a positive temperature coefficient (PTC) device for cutting off the supplied electric current when the internal temperature rises above its limit, or a safety vent for ventilation when the internal pressure rises above its limit.

The typical safety device adapted for a canned lithium-ion battery can endure an internal pressure of up to 20 kg /cm$^2$ when overcharged. However, it has a complicated structure and is difficult to manufacture.

While canned lithium-ion batteries use a nickel-plated metal as a packaging material, plastic lithium-ion batteries are enclosed within an aluminum pouch formed by coating aluminum foil with nylon, polyethylene-co-acrylic acid (EAA), or polyethylene (PE) films. Although applications of such a metal container for secondary batteries are limited due to its rigidity, since the aluminum pouch as a packaging material for batteries is flexible, the aluminum pouch can be more easily adjusted to accommodate various sizes.

Also, the aluminum pouch is less resistant to the internal pressure increases due to the gas generation as described above than metal canning materials, so it can easily burst even with a relatively small increase in the internal pressure. Furthermore, since the gases generated within the aluminum pouch are flammable, the risk of explosion is even higher.

An example of an aluminum pouch for secondary lithium polymer batteries, capable of eliminating those problems, is disclosed in Japanese Patent Laid-open Publication No. hei 2000-100399. In the disclosure, the aluminum pouch includes thermally fusible layers capable of sealing the accommodation space of an assembly of electrode plates bound together when fused, and a region of the aluminum pouch is formed to rupture easily. The rupture-susceptible region is melted at a lower temperature than other regions and thus has a small binding strength to rupture when the internal pressure of the battery rises above a predetermined level.

However, it is difficult to form the rupture-susceptible region by selectively melting it at a lower temperature and to control the binding strength at the rupture-susceptible region according to rupture pressures. Accordingly, it is more likely to fail thereby lowering productivity.

Other examples of secondary lithium batteries are disclosed in U.S. Pat. Nos. 6,040,081 and 6,145,280.

SUMMARY OF THE INVENTION

Accordingly, the invention provides a secondary battery having reduced risk of explosion due to the gases and heats generated by thermal decomposition of the electrolyte in the battery.

The invention also provides a secondary battery with improved hermeticity between electrode tabs of an electrode assembly and sealed portions.

In one embodiment, the invention provides a secondary battery comprising: an electrode assembly having two electrode tabs; a laminated container laminated with flexible films, which encloses the electrode assembly while the electrode tabs are drawn out of the laminated container and is sealed by fusing the resulting structure within a sealed portion; and a safety unit in the sealed portion, capable of being melted by excessive heat generated from the secondary battery.

In the secondary battery according to the present invention, the safety unit may be a tape formed of a low melting point synthetic resin. The tape is formed of a single or dual-layered structure including at least one selected from the group consisting of ethylene vinylacetates, linear low-density polyethylenes, and polypropylenes.

In another embodiment, the invention provides a secondary battery comprising: an electrode assembly having two electrode tabs; a laminated container having a main body including a receiving portion in which the electrode assembly is placed and a first binding portion around the receiving portion, and an upper cover including a second binding portion along its edge, wherein the first and second binding portions are bound together to form a sealed portion while the electrode tabs protrude from one edge of the sealed portion; and a safety unit interposed between the first and second binding portions forming the sealed portion, capable of being melted by excess heat generated from the electrode assembly.

In the secondary battery, the safety unit may be a tape formed of at least one selected from the group consisting of ethylene vinylacetates, linear low-density polyethylenes, and polypropylenes.

The secondary battery may further comprise a sealing member between each of the electrode tabs and the first and second binding portions. In this case, the sealing member is a tape formed of at least one selected from the group consisting of ethylene vinylacetates, linear low-density polyethylenes, and polypropylenes. The tape can be formed of a single or dual-layered structure including the forgoing materials.

BRIEF DESCRIPTION OF THE DRAWINGS

The above features and advantages of the present invention will become more apparent by describing in detail exemplary embodiments thereof with reference to the attached drawings.

DETAILED DESCRIPTION OF THE INVENTION

Figure 1:
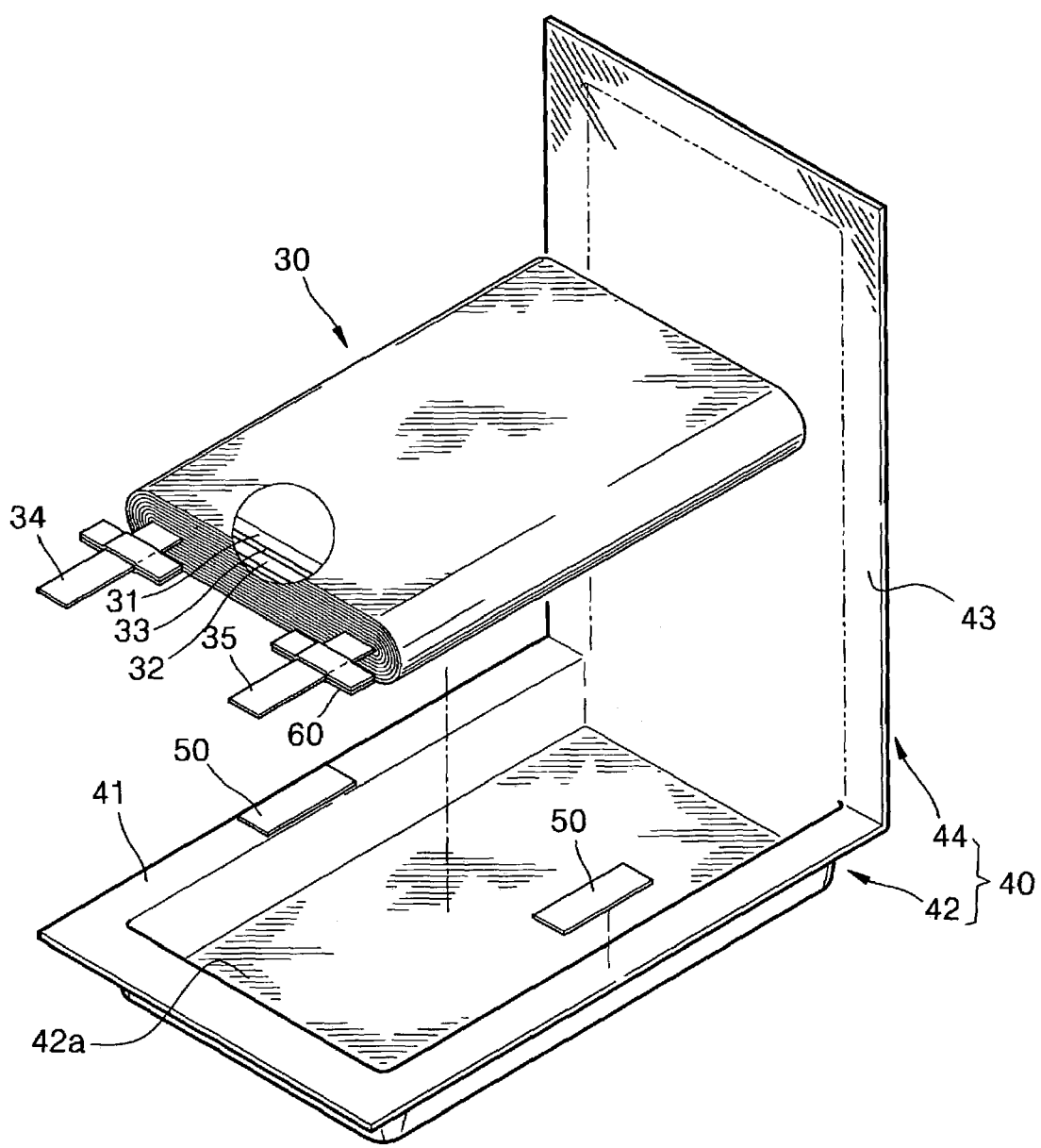
FIG. 1 is an exploded perspective view of a secondary battery according to the present invention.
Figure 3:
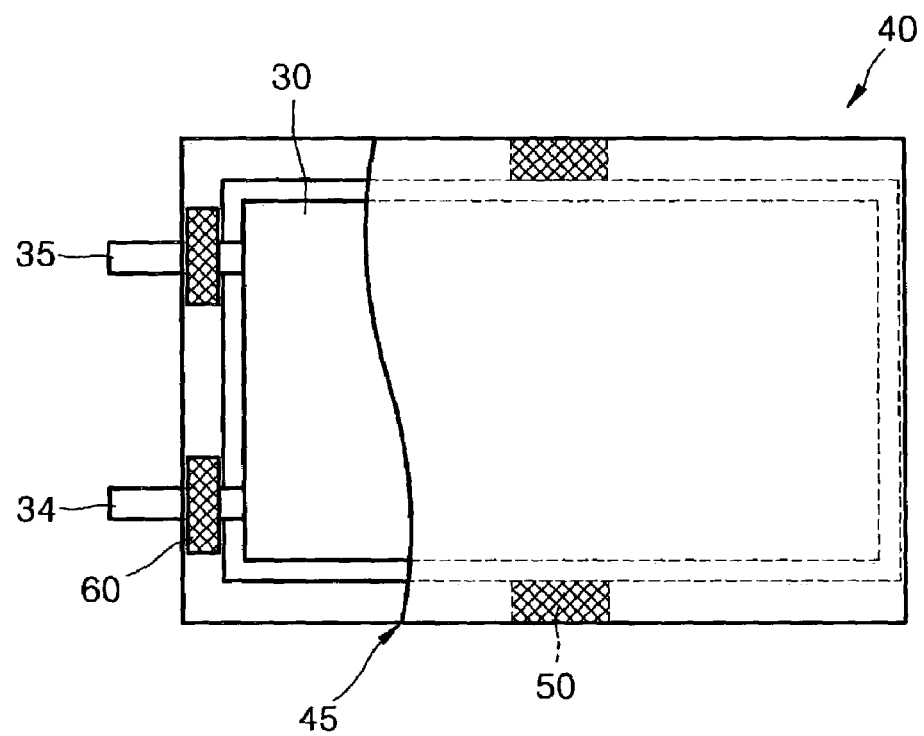
FIG. 3 is a plan view of a secondary battery according to the present invention.

FIGS. 1 and 3 show an embodiment of a secondary battery according to the present invention. Referring to FIGS. 1 and 3, the secondary battery includes an electrode assembly 30 having a cathode plate 31, an anode plate 32, and a separator 33 interposed between the cathode plate 31 and the anode plate 32 for electrically insulating the same, wherein each of the cathode plate 31 and the anode plate 32 has an active material layer of an active material and an additive on a respective current collector. The cathode plate 31, the anode plate 32, and the separator can be cut to a predetermined size and stacked upon one another or can be wound together to form a roll. A cathode tab 34 is electrically connected to the cathode plate 31 of the electrode assembly 30, and an anode tab 35 is electrically connected to the anode plate 31 of the electrode assembly 30.

The electrode assembly 30 is sealed in a laminated container 40 that is formed of a flexible material. The cathode tab 34 and the anode tab 35 are drawn out of the laminated container 40 and act as terminals of the battery. The laminated container 40 is formed by coating aluminum foil with nylon, polyethylene-co-acrylic acid (EAA), or polyethylene (PE) films. However, materials for the laminated container 40 are not limited to these materials, and any flexible material having a predetermined tensile strength and insulating the electrode assembly 30 can be used.

The laminated container 40 for enclosing the electrode assembly 30 includes a main body 42 having a receiving portion 42a in which the electrode assembly 30 is placed and a first binding portion 41 around the receiving portion 42a, and a cover 44 extending from the main body 42 and having a second binding portion 43 along its edge. When the first binding portion 41 and the second binding portion 42 are fused together, the electrode assembly 30 in the receiving portion 42a is sealed. The first binding portion 41 and the second biding portion 42 are fused to bind together, and forms a sealed portion 45.

Figure 4:
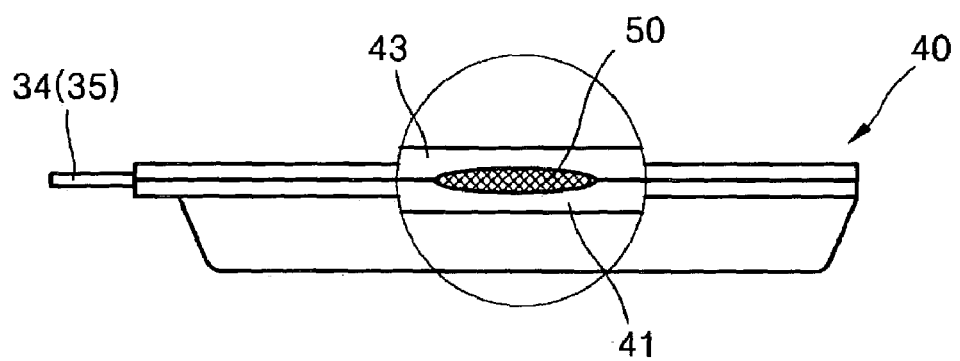
FIG. 4 is a side view of a sealed portion of the secondary battery according to the present invention.

As a safety unit, a tape 50 formed to a predetermined length using a material having a lower melting point than the material for the laminated container 40 is fused between the first binding portion 41 of the main body 42 and the second binding portion 43 of the upper cover 44, as shown in FIG. 4. The tape 50 is formed of a low melting point synthetic resin. Suitable synthetic resins include polyethylene vinylacetates having a melting point of 60–100° C., linear-low density polyethylenes having a melting point of 90–120° C., and polypropylenes having a melting point of 100–180° C.

Figure 2A:
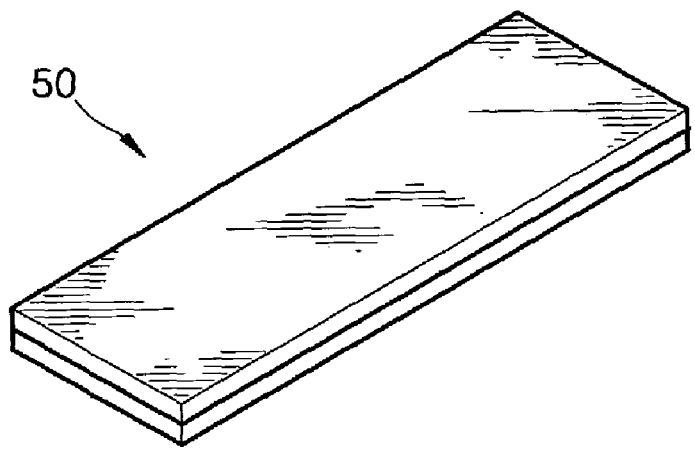
FIGS. 2A and 2B show examples of a tape as a safety unit.
Figure 2B:
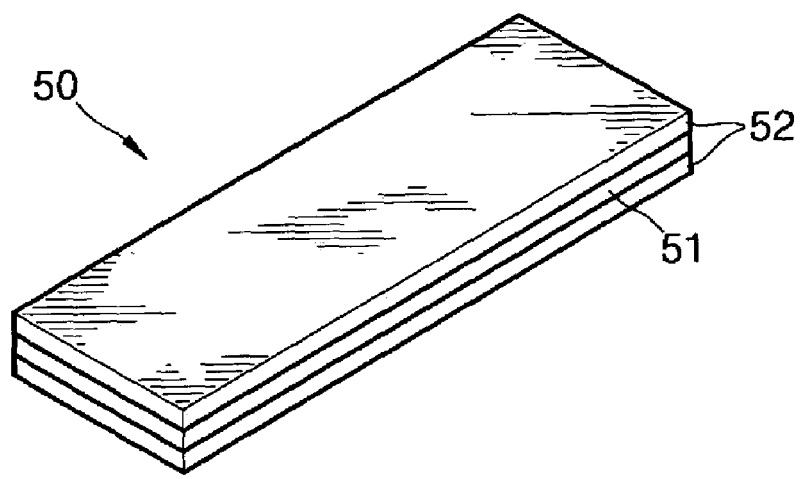

The tape 50 may be formed of a single layer using the above-listed materials. Alternatively, the tape 50 can be formed of at least two or three layers using those materials, as shown in FIGS. 2A and 2B. When the tape 50 is formed of three layers, a linear-low density polyethylene layer 51 can be interposed between two polypropylene layers 52. The tape 50 can be formed in various ways using low melting point materials without limitation to the above embodiment. However, it is preferable that a middle portion of the tape 50 have a lower melting point than an upper surface portion and a lower surface portion of the tape 50.

The cathode tab 34 and the anode tab 35 of the electrode assembly are located in the sealed portion 45, i.e., between the first binding portion 41 and the second binding portions 43, wherein a sealing member 60 is interposed between the cathode tab 34 and the anode tab 35, and each of the first and second binding portions 41 and 43. The tape 50 as described above can be used as the sealing member 60. In this case, it is unnecessary for a tape for the sealing member 60 to have a lower melting point in the middle portion than in the upper and lower surface portions.

Any safety structure can be applied in the present invention without limitation to the above-described embodiment as long as it can allow a portion of the sealed portion formed by fusing the first and second binding portions 41 and 43 to melt earlier than the laminated container 40 at a temperature lower than the melting point of the laminated container 40 by the heat generated when the electrode assembly 30 is abnormally charged or discharged.

In the secondary battery according to the present invention having the above-described structure, when thermal decomposition of the electrolyte occurs at the cathode due to overcharging of the battery. This generates heat and gases. The heat is transferred to the tape 50 disposed in the sealed portion 45 of the laminated container 40 as the safety unit. Consequently, the tape 50 melts and the internal gases leak to the outside, thereby preventing explosion of the laminated container 40.

The tape 50 interposed between the first binding portion 41 and the second binding portion 43 forming the sealed portion 45 has a relatively low melting point in its middle portion than in its upper surface portion and lower surface portion. Accordingly, while the upper surface portion and the lower surface portion of the tape 50 are fused to the first and second binding portions 41 and 43, the middle portion of the tape 50 can be easily melted by heat.

According to the present invention, to enhance hermeticity of the secondary battery near the cathode tab 34 and the anode tab 35 disposed between the first and second binding portions 41 and 43, the sealing member 60 is used. The sealing member 60 is formed of a synthetic resin having a relatively low melting point, such as ethylene vinylacetate, linear-low density polyethylene, or polypropylene, thereby ensuring hermeticity in binding the first and second binding portions 41 and 43.

As described above, in the secondary battery according to the present invention, the first and second sealing portions are fused to form the sealed portion of the secondary battery while the tape having a low melting point is interposed between the first and second sealing portions as a safety unit. The tape melts earlier than the laminated container by heat generated when the battery is overcharged, and internal gases leak to the outside, thereby preventing explosion of the battery.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A secondary battery, comprising:
an electrode assembly;
a container laminated with flexible films and enclosing the electrode assembly, wherein the container is sealed by fusing two portions of the container together to form a sealed portion, thereby enclosing the electrode assembly within the container;
a safety unit; and
wherein the safety unit comprises a tape arranged between the two portions of the container and arranged within the sealed portion of the container, wherein the safety unit has a melting point below that for the container, wherein the tape is a different layer than the two portions of the container, and wherein electrode assembly tabs are positioned on at least one side of the container and the tape is positioned on at least a different side of the container.

2. The secondary battery of claim 1, wherein the tape is formed of a low melting point synthetic resin.

3. The secondary battery of claim 2, wherein the tape is formed of at least one selected from the group consisting of ethylene vinylacetates, linear low-density polyethylenes, and polypropylenes.

4. The secondary battery of claim 3, wherein the tape is a stack of at least two layers of synthetic resin.

5. The secondary battery of claims 3, wherein a middle portion of the tape has a lower melting point than an upper surface portion and a lower surface portion of the tape.

6. The secondary battery of claim 4, wherein a middle portion of the tape has a lower melting point than an upper surface portion and a lower surface portion of the tape.

7. A secondary battery, comprising:
an electrode assembly;
a laminated container having a main body including a receiving portion that accommodates the electrode assembly and a first binding portion around the receiving portion, and an upper cover including a second binding portion, wherein the first binding portion and the second binding portion are bound together to form a sealed portion; and
a safety unit comprising a tape arranged between the first binding portion and the second binding portion forming the sealed portion, wherein the tape is a different layer than the first binding portion and the second binding portion, wherein the safety unit is capable of being melted by excessive heat generated from the electrode assembly and wherein electrode assembly tabs are positioned on at least one side of the container and the safety unit is positioned on at least a different side of the container.

8. The secondary battery of claim 7, wherein the tape formed of at least one selected from the group consisting of ethylene vinylacetates, linear low-density polyethylenes, and polypropylenes.

9. The secondary battery of claim 8, wherein a middle portion of the tape has a lower melting point than an upper surface portion and a lower surface portion of the tape.

10. The secondary battery of claim 7, further comprising a sealing member between the first binding portion and the second binding portion.

11. The secondary battery of claim 10, wherein the sealing member is a tape formed of at least one selected from the group consisting of ethylene vinylacetates, linear low-density polyethylenes, and polypropylenes.

* * * * *